US005922155A

United States Patent [19]

Clouet et al.

[11] Patent Number: 5,922,155

[45] Date of Patent: Jul. 13, 1999

[54] METHOD AND DEVICE FOR MANUFACTURING AN INSULATIVE MATERIAL CELLULAR INSULATOR AROUND A CONDUCTOR AND COAXIAL CABLE PROVIDED WITH AN INSULATOR OF THIS KIND

[75] Inventors: Pascal Clouet, Gregy sur Yerres; Jean-Jacques Maisseu, Reims; Francois Vaille, Corbeil Essonnes; Alain Vernanchet, Draveil, all of France

[73] Assignee: Filotex, Draveil, France

[21] Appl. No.: 08/844,878

[22] Filed: Apr. 22, 1997

Related U.S. Application Data

[30] Foreign Application Priority Data

Apr. 23, 1996 [FR] France .................................. 96 05101

[51] Int. Cl.[6] .................................................... B29C 63/20

[52] U.S. Cl. ........................................ 156/51; 156/244.12

[58] Field of Search ................................ 156/244.12, 51, 156/244.11; 264/171.1, 171.12, 171.26, 172.1, 171.14, 172.15, 177.1, 177.12, 177.14, 177.16; 425/113

[56] References Cited

U.S. PATENT DOCUMENTS 3,771,934 11/1973 Delves-Broughton .................. 425/135

FOREIGN PATENT DOCUMENTS 539772 7/1955 Belgium .

2133453 1/1973 Germany .

*Primary Examiner*—Francis J. Lorin

*Attorney, Agent, or Firm*—Sughrue, Mion, Zinn, Macpeak & Seas, PLLC

[57] ABSTRACT

A method of manufacturing an insulative material cellular insulator around a conductor, the insulator having a longitudinal passage in which the conductor is housed and closed cells extending longitudinally and separated from each other by radial walls, includes the following operations: the insulative material in the viscous state is extruded to impart the required shape to it to form the cells, the insulative material shaped in this way is applied to the conductor, and the insulative material is cooled to obtain the insulator. The insulative material is applied to the conductor at a distance from the exit of the shaping device such that the material is drawn down sufficiently for the walls of the cells not to be thinned without pressurizing the cells.

6 Claims, 2 Drawing Sheets

METHOD AND DEVICE FOR MANUFACTURING AN INSULATIVE MATERIAL CELLULAR INSULATOR AROUND A CONDUCTOR AND COAXIAL CABLE PROVIDED WITH AN INSULATOR OF THIS KIND

BACKGROUND OF THE INVENTION

1. Field of the Invention

The present invention concerns a method and a device for manufacturing an insulative material cellular insulator around a conductor. It applies more particularly, but not in any limiting way, to the manufacture of dielectric intermediate insulators of coaxial cables.

2. Description of the Prior Art

Coaxial cables usually include a solid or stranded central conductor surrounded by an intermediate insulator made of an insulative dielectric material in turn surrounded by an outer conductor protected by a protective outer sheath. The dielectric intermediate insulator must have specific dielectric properties in order to obtain the attenuation characteristics required of the cable, in particular at high frequencies. To be more precise, this insulator is generally required to have a dielectric constant less than about 1.8 and as close as possible to 1. The closer the dielectric constant to 1, the higher the frequencies at which the cable can be used.

The insulative materials conventionally used in cable-making do not have dielectric constants of this order when they are used in solid form. Their dielectric constants are generally close to 2. This applies to polyethylene and to polytetrafluoroethylene (PTFE) in particular. The use of these materials to form cellular insulators to reduce the dielectric constant is known in itself.

Cellular insulators are those into which a plurality of bubbles filled with air or with a gas having a dielectric constant close to 1 are introduced during the application (generally by extrusion) of the insulative material to form an insulator, and usually by means of a chemical reaction. The present invention is not concerned with this type of insulator.

Cellular insulators, with which the present invention is concerned, have cells extending longitudinally (in a straight line or in a helix) along the cable and separated from each other by radial walls, the cells being obtained by shaping the insulative material used, which in this case is solid, using an extrusion device having the appropriate openings and passages for this purpose. The cells are entirely closed, with the result that the intermediate insulator is cylindrical or polygonal and its cross-section resembles a spoked wheel.

One method of manufacturing a cylindrical cellular intermediate insulator in which the cells are entirely closed is described in U.S. Pat. No. 3,771,934. It involves extruding the insulative material, in the viscous state of course, imparting the required shape to it by shaping means to form the cells, applying the material formed in this way to the central conductor, and finally cooling this insulative material to obtain the insulator.

In this method, the material shaped by extrusion is applied to the central conductor immediately on leaving the shaping means. Accordingly, to prevent thinning of the very thin top walls of the cells (those adapted to come into contact with the outer conductor of the cable) it is necessary to pressurize the cells during manufacture. This complicates manufacture.

Moreover, the shaped material passes suddenly from the guide to the conductor, which causes it to undergo a large variation in diameter which can cause longitudinal cracks in the shaped insulator.

Finally, this method cannot be used to manufacture coaxial cables with cellular insulation having a low dielectric constant and a small diameter intermediate insulator.

A first aim of the present invention is therefore to develop a method of manufacturing a cellular insulator around a conductor which enables pressurization of the cells to be dispensed with.

Another aim of the present invention is to develop a method of this kind that is free of the risk of cracking of the shaped insulator.

SUMMARY OF THE INVENTION

To this end, the present invention consists in a method of manufacturing an insulative material cellular insulator around a conductor, the insulator having a longitudinal passage in which the conductor is housed and closed cells extending longitudinally and separated from each other by radial walls, the method comprising the following operations:

- the insulative material in the viscous state is extruded to impart the required shape to it by means of shaping means to form the cells,
- the insulative material shaped in this way is applied to the conductor, and
- the insulative material is cooled to obtain the insulator, and in which method the insulative material is applied to the conductor at a distance from the exit of the shaping means such that the material is drawn down sufficiently for the walls of the cells not to be thinned without pressurizing the cells.

Using the method of the invention, given that the shaped material is not applied to the conductor immediately after it leaves the shaping means, the drawing down of the material is sufficient to prevent the walls of the cells thinning and it is therefore no longer necessary to pressurize the cells. The method of the invention is therefore much simpler to use than the prior art method.

Furthermore, because of the drawing down, no cracking of the manufactured insulator can occur.

The method of the invention can be used to manufacture the intermediate insulator of a coaxial cable with a small diameter (less than 5 mm) intermediate insulator having a low dielectric constant (less than 1.7), which has not previously been possible.

The device for implementing the method described in U.S. Pat. No. 3,771,934 includes a guide in which there is an interior longitudinal channel through which the central conductor of the cable passes and a die coaxial with the guide, surrounding the latter and defining with the exterior surface of the guide a passage for the insulative material in the viscous state, the shape of the insulator being obtained by openings formed in the guide itself, so that the shape of the cross-section of the intermediate insulator obtained is substantially identical to that of the openings in the guide associated with that of the passage defined between the die and the guide.

This arrangement cannot be used to manufacture coaxial cables with a small diameter intermediate insulator, typically less than 5 mm, used in the medical field in particular. To manufacture the intermediate insulator of such cables by the method described in the previous patent, in which the shape of the intermediate insulator obtained is a "photograph" with no "reduction" of the empty parts of the guide, to obtain an insulator having the required dimensions immediately on leaving the device it would be necessary to use a very small guide. A high ratio is required in the cross-section of the insulator between the total surface area of the parts devoid of material and the total surface area which is typically greater than 40, i.e. a low dielectric constant, typically less than 1.7. It is not possible to form in a guide this small openings capable of producing a ratio of this magnitude, as this would lead to the guide having insufficient mechanical strength to be used to manufacture the intermediate insulator.

Another aim of the present invention is therefore to provide a device for implementing the above method enabling manufacture of cables having both a small diameter intermediate insulator and a low dielectric constant.

To this end the present invention proposes a device for implementing the method of the invention comprising:

- a guide having an interior longitudinal channel through which said conductor passes,
- a die coaxial with and around the guide, defining with the exterior surface of the guide a passage for the insulative material in the viscous state, and including at least one opening communicating with said passage and into which said material in the viscous state can be introduced, the position around said passage and the shape of said opening(s) being such that on leaving said die said material incorporates said cells.

The combination of the following two features:

- use of a device in which the openings are formed in the die and not in the guide, and
- drawing down of the material before its application to the conductor, produces intermediate insulators having dimensions as small as required and in particular dimensions compatible with applications in the medical field.

In one particularly advantageous embodiment of the device of the invention the die includes a plurality of identical openings disposed symmetrically about its longitudinal axis, the cross-section of each of the openings having substantially the shape of a T the horizontal bar of which is curved about the longitudinal axis, the curved horizontal bars of the various Ts all forming parts of a common cylinder and lines extending their vertical bars intersecting on the longitudinal axis.

With a device of this kind, given that the shaped insulative material is drawn down before it is applied to the conductor, it is subject to a pressure at the exit from the die which tends to bring the horizontal bars of the Ts into contact with each other to produce the required insulator.

With the device and the method of the invention, depending on the draw down rate applied, it is possible to manufacture intermediate insulators having either a shape that is substantially identical, ignoring a coefficient of geometrical similarity, to that of the die (if the latter includes T-shaped openings, the shape of the insulator is identical to that of the die after closing up of the horizontal bars of the Ts), or somewhat different.

Finally, the present invention concerns a coaxial cable, preferably made by the method of the invention, comprising, coaxially disposed from the interior towards the exterior:

- a central conductor,
- an insulative dielectric material intermediate insulator including a longitudinal passage in which the conductor is housed and closed cells extending longitudinally and separated from each other by radial walls,
- an outer conductor, and
- an outer protective sheath, wherein the outside diameter of the intermediate insulator is less than 5 mm and its dielectric constant is less than 1.7.

The method and the device of the invention have enabled a cable of this kind to be made for the first time.

Other features and advantages of the present invention will emerge from the following description of a method and of a device in accordance with the invention given by way of illustrative and non-limiting example.

DETAILED DESCRIPTION OF THE PREFERRED EMBODIMENTS

Components common to all the figures carry the same reference numbers.

Figure 1:
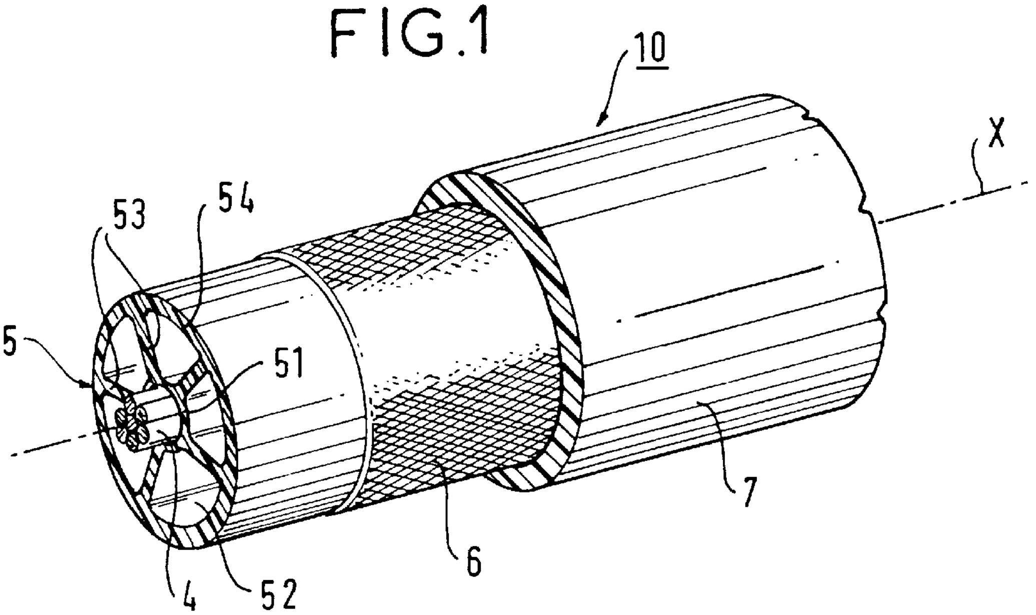
FIG. 1 is a partially cut away perspective view of a coaxial cable with a cellular intermediate insulator made in accordance with the invention.

A coaxial cable 10 that can be made in accordance with the invention is shown in FIG. 1. It includes, disposed coaxially from the interior towards the exterior about a longitudinal axis X:

- a copper inner electrical conductor 4, for example a plurality of stranded conductor wires,
- a dielectric insulative material, for example ethylene and propylene fluoride (EPF) intermediate insulator 5 having a cylindrical tubular part 51 in contact with the conductor 4, a plurality of cells 52 extending longitudinally and in a straight line along the axis X and separated from each other by radial walls 53, and a cylindrical tubular part 54 surrounding the radial walls 53 so that the cross-section of the intermediate insulator 5 resembles a spoked wheel,
- a braided or woven outer conductor 6 which bears on the cylindrical tubular part 54 of the insulator 5,
- a protective outer sheath 7.

Typical dimensions are given below for two coaxial cables of the type described hereinabove.

A coaxial cable for use in the medical field, i.e. of small size, has the following dimensions:

- diameter of the inner conductor 4: 0.12 mm,
- outside diameter of the intermediate insulator 5: 0.51 mm,
- outer conductor 6 made up of woven strands 0.03 mm in diameter with 98% overlap,
- outside diameter of the outer sheath 7: 0.55 mm.

A coaxial cable for use in telecommunications, i.e. of medium size, has the following dimensions:

- diameter of the inner conductor 4: 0.25 mm,
- outside diameter of the intermediate insulator 5: 1.20 mm,
- outer conductor 6 made up of braided strands 0.10 mm in diameter with 66% overlap,
- outside diameter of the outer sheath 7: 2 mm.

Figure 2:
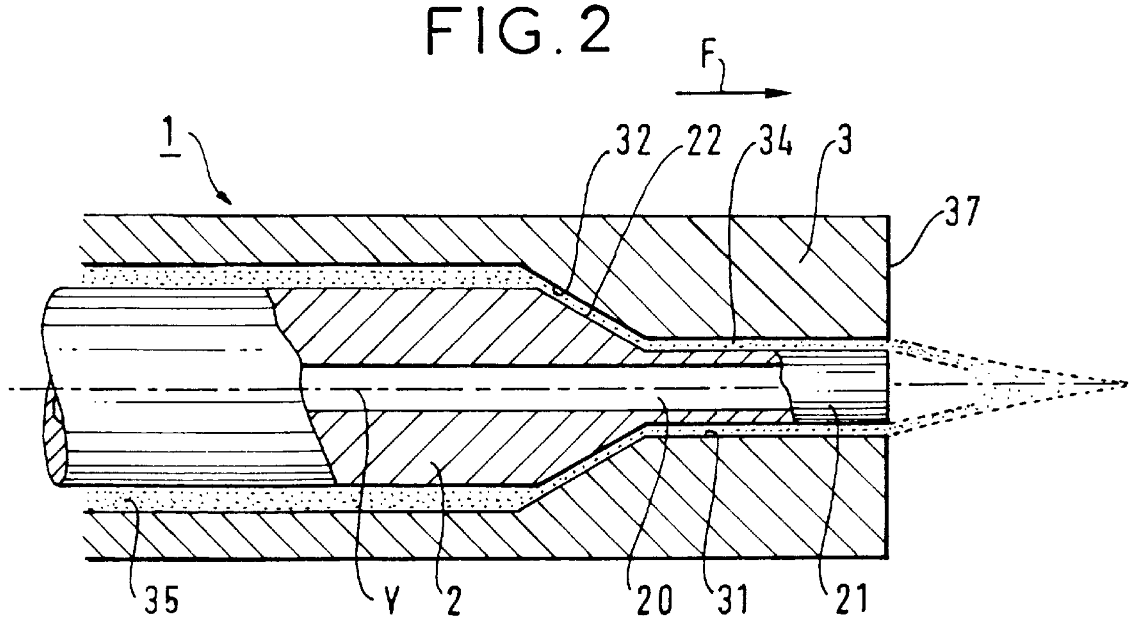
FIG. 2 shows a diagrammatic side view of a device of the invention.

FIG. 2 shows an extrusion device 1 of the invention for manufacturing the intermediate insulator 5 of the cable 10 from FIG. 1. This device includes a guide 2 and a die 3.

The guide 2 has a cylindrical interior channel 20 around the longitudinal axis Y of the guide. The channel 20 provides a passage for the conductor 4. The guide 2 has a substantially cylindrical part 21 extended by a frustoconical part 22 the smaller diameter base of which has a diameter equal to that of the cylindrical part 21.

The die 3 surrounds and is coaxial with the guide 2. Its outside surface is cylindrical and its inside surface 30 has a cylindrical part 31 extended by a frustoconical part 32. The inside surface 30 of the die 3 defines with the guide 2 a cylindrical passage 34 for the insulative material 35 that is to constitute the intermediate insulator 5. This insulative material 35 comes from the crosshead (not shown) of the extrusion device, located downstream of the die-guide assembly.

Openings (not shown in FIG. 2) communicating with the passage 34 are formed in the cylindrical part 31 of the die 3 to confer upon the insulative material 35 the shape required for the insulator 5 to have a transverse cross-section resembling a spoked wheel. These openings could equally well be in the guide 2, but as explained below it is preferable for them to be in the die 3.

To manufacture the insulative intermediate insulator 5 around the conductor 4, the latter is caused to move in the channel 20 in the direction indicated by the arrow F in FIG. 2, i.e. in the sense of reducing diameters of the frustoconical parts 21 and 31 of the guide 2 and of the die 3, respectively. Simultaneously, the insulative material 35 in the viscous state is introduced under pressure so that it fills the passage 34 and the openings in the die 3.

In accordance with the invention, the material shaped in this way does not come into contact with the conductor 4 immediately at the exit 37 from the die 3 (in the direction of the arrow F), but at a non-null distance from this exit 37, so that it is drawn down before it is applied to the conductor 4. It is this drawing down which prevents the walls 53 and 54 of the cells 52 thinning when the material of which they are constituted is still viscous, without any pressurization of the cells 52 being needed, as in the prior art.

The distance between the exit 37 from the die 3 and the area of contact between the shaped insulator and the conductor 4 depends on the required draw down ratio. For a given draw down ratio, it is set by the speed of movement of the conductor 4. For example, it can vary between twice and 20 times the inside diameter of the die 3.

In accordance with the invention, the distance between the exit 37 of the die 3 and the point of application to the conductor 4 of the insulator being formed must be such that the draw down ratio is at least equal to 25.

It will be remembered that the draw down ratio (DDR) is given by the following formula:

$$DDR = \frac{D_F^2 - D_G^2}{D_f^2 - D_g^2}$$

where $D_F$ is the outside diameter of the openings in the die 3, $D_G$ is the outside diameter of the cylindrical part 21 of the guide 2, $D_f$ is the outside diameter of the insulator 5 and $D_g$ is the outside diameter of the tubular part 51 of the insulator 5.

Given that the shaped insulative material is drawn down before it is applied to the conductor 4, the cross-section of the intermediate insulator obtained is necessarily smaller than and geometrically similar to that of the empty parts defined by the openings through which the material passes in the viscous state. In this way, when the openings are in the die, which necessarily has a larger surface area than the guide, by choosing an appropriate draw down ratio it is possible to obtain an intermediate insulator having very small dimensions and a low dielectric constant by adjusting the size of the openings so that the cells have a large cross-section.

Figure 4:
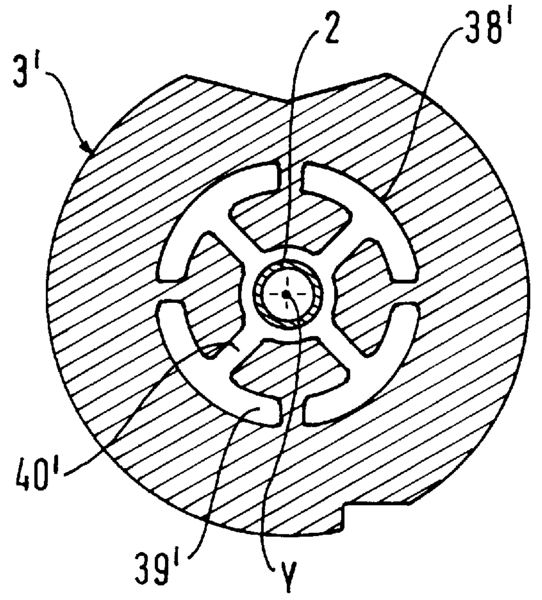
FIG. 4 is a cross-section of FIG. 2 at the level of the guide and of the die producing the intermediate insulator shown in FIG. 3.

FIG. 4 shows in cross-section the guide 2 and a die 3' of the invention. The four openings 38' of the die 3' extend longitudinally through its cylindrical part 31 and communicate with the passage 34. Each of the openings 38' is substantially T-shaped with the horizontal bar 39' curved about the axis Y. They all form part of a common cylinder with the same axis Y. The vertical bars 40' of the Ts communicate with the passage 34 and lines extending them intersect on the axis Y.

The diameter at the top of the curved horizontal parts 39' is 8 mm and their diameter at the base is 6.4 mm, with the result that they have a thickness of 0.8 mm.

Figure 3:
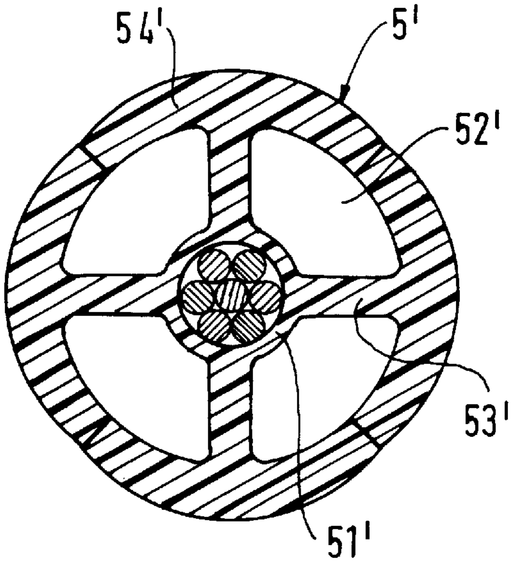
FIG. 3 is a cross-section of FIG. 1 showing only the inner conductor and the intermediate insulator.

The die 3' produces the intermediate insulator 5' shown in FIG. 3 when the draw down ratio is 235. FIG. 3 shows that the parts of the insulator 5' originating in the horizontal bars of the Ts 39' have come into contact with each other to form the substantially cylindrical exterior tubular part 54' of the insulator 5'. This figure also shows that the cross-section of the insulator 5' is practically identical to that of the empty parts (openings 38' and passage 34) of the die 3', apart from the fact that the horizontal bars of the Ts have come into contact with each other. This occurs if the draw down ratio is high, in practise greater than 150. In this case, the volume of air present in the insulator 5' can be precisely controlled since the insulator is geometrically similar to the empty parts of the die 3'. This type of die, used with a high draw down ratio, can be used to produce coaxial cables of small size, usable in particular in the medical field.

Accordingly, an intermediate insulator with small dimensions (outside diameter: 0.51 mm) having a low dielectric constant (1.57) can be produced.

Figure 6:
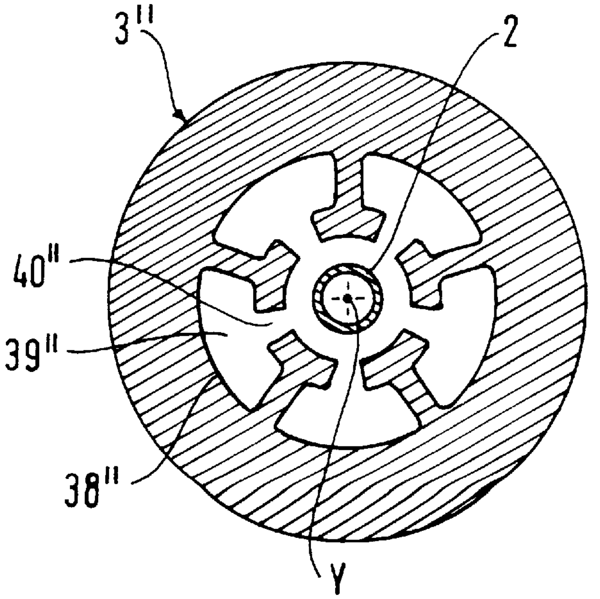
FIG. 6 is a cross-section of FIG. 2 at the level of the guide and of a variant of the die for producing the intermediate insulator shown in FIG. 5.

FIG. 6 shows the cross-section of the guide 2 and of another die 3" of the invention. The five openings 38" of the die 3" extend longitudinally through its cylindrical part 31 and communicate with the passage 34. Each of the openings 38" is substantially T-shape with the horizontal bar 39" curved around the axis Y. They all form parts of a common cylinder with the same axis Y. The vertical bars 40" of the Ts communicate with the passage 34 and lines extending them intersect on the axis Y.

The diameter at the top of the curved horizontal parts 39" is 7 mm and their diameter at the base is 4.37 mm, with the result that they have a thickness of 1.315 mm, i.e. they are much thicker than the curved horizontal parts 39' of the openings 38' in the die from FIG. 3.

Figure 5:
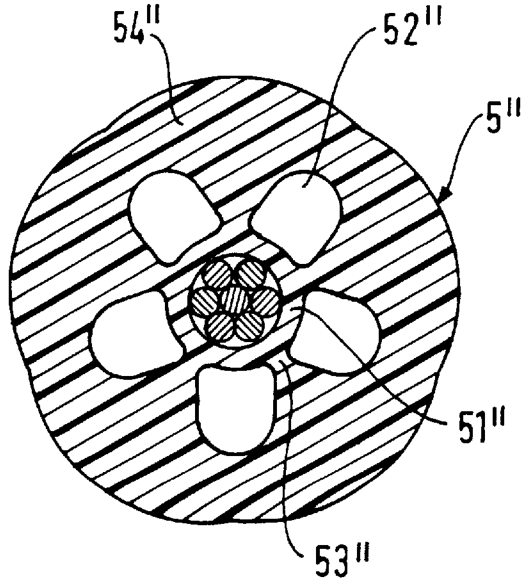
FIG. 5 is a cross-section of FIG. 1 showing only the inner conductor and a variant of the intermediate insulator.

The die 3" can be used to produce the intermediate insulator 5" shown in FIG. 5 if the draw down ratio is 32. FIG. 5 shows not only that the parts of the insulator 5" originating in the horizontal bars of the Ts 39" have come into contact with each other, but also that they interpenetrate to form the outside substantially cylindrical tubular part 54" of the insulator 5". This figure also shows that the cross-section of the insulator 5" is somewhat different than that of the empty parts (openings 38" and passage 34) of the die 3". This occurs when the draw down ratio is lower, in practise in the order of 50. In this case, the volume of air in the insulator 5" is controlled less precisely, since the insulator is no longer geometrically similar to the empty parts of the die 3". This type of die, used with a lower draw down ratio, is intended rather for the manufacture of intermediate insulators having medium dimensions, for coaxial cables used in telecommunications.

Accordingly an intermediate insulator having an outside diameter of 1.2 mm and a low dielectric constant (1.56) can be obtained.

The coaxial cables obtained by the method and the device of the present invention have electrical specifications that satisfy the requirements of the intended applications. Their impedance is around 75 Ω.

Their intermediate insulators can be stripped as easily as from solid insulation. The external cylindrical shape of the intermediate insulators is sufficient to enable the outer conductor to be cut quickly and precisely. Moreover, these insulators are homogeneous and free of cracks.

The cables obtained are resistant to crushing and to bending stresses.

Finally, the method of the invention enables the use of the same type of device as those used to extrude solid insulators, apart from the machining of the die.

Of course, the present invention is not limited to the embodiments just described.

Firstly, it can be used not only to manufacture cellular insulators of coaxial cables, but also to manufacture cellular insulators in all types of cable requiring this type of insulator, for example twisted pair or twisted quad cables.

Moreover, the material used to manufacture the insulator can be any type of material that can be extruded, and in particular a thermoplastics material, capable of withstanding draw down ratios of the magnitude of those required to put the invention into effect. This can be EPF or ethylene tetrafluoroethylene (ETFE), polyvinylidine difluoride (PVDF) or perfluoroalkoxy (PFA)® (registered trade mark of Du Pont de Nemours).

The cells can be filled with air or any other gas for reducing the dielectric constant of the insulator. In this case the extrusion is carried out in an atmosphere of the gas filling the cells.

Moreover, by rotating the die about its longitudinal axis it is possible to obtain helical cells enabling the cable to withstand bending stresses better.

The openings in the die can have any geometry enabling the required insulator shape to be obtained. In particular, the die can have an opening having a shape identical to the cross-section of the insulator to be manufactured.

Finally, any means as described can be replaced by equivalent means without departing from the scope of the present invention.

There is claimed:

1. A method of manufacturing an insulative material cellular insulator around a conductor, said insulator having a longitudinal passage in which said conductor is housed and closed cells extending longitudinally and separated from each other by radial walls, said method comprising the following steps:

extruding said insulative material in the viscous state to impart the required shape to it by means of shaping means to form said cells, applying said insulative material thus shaped to said conductor, and cooling said insulative material to obtain said insulator, wherein said applying step is performed at a distance from the exit of the shaping means such that said material is drawn down sufficiently for the walls of the cells not to be thinned without pressurizing said cells.

2. The method claimed in claim 1 wherein said distance is such that the draw down ratio of said material is at least equal to 25.

3. The method claimed in claim 1 wherein said insulative material is a thermoplastics material.

4. The method claimed in claim 3 wherein said insulative material is ethylene and propylene fluoride.

5. A device for implementing the method claimed in claim 1 comprising:

a guide having an interior longitudinal channel through which said conductor passes, a die coaxial with and around said guide, defining with the exterior surface of said guide said cell for passage of said insulative material in the viscous state, and including at least one opening communicating with said passage and into which said material in the viscous state can be introduced, the position around said passage and the shape of said opening(s) being such that on leaving said die said material incorporates said cells.

6. The device claimed in claim 5 wherein said die includes a plurality of identical openings disposed symmetrically about its longitudinal axis, the cross-section of each of said openings having substantially the shape of a T the horizontal bar of which is curved about said longitudinal axis, the curved horizontal bars of the various Ts all forming parts of a common cylinder and lines extending their vertical bars intersecting on said longitudinal axis.

* * * * *